United States Patent
Peeters

(10) Patent No.: US 12,415,332 B2
(45) Date of Patent: Sep. 16, 2025

(54) COMPOSITE STRUCTURE, AND METHODS FOR ARRANGING WEBS AND CORE ELEMENTS IN MANUFACTURING OF A COMPOSITE STRUCTURE

(71) Applicant: FiberCore IP B.V., Rotterdam (NL)

(72) Inventor: Johannes Hendricus Alphonsus Peeters, Rotterdam (NL)

(73) Assignee: FiberCore IP B.V., Rotterdam (NL)

( * ) Notice: Subject to any disclaimer, the term of this patent is extended or adjusted under 35 U.S.C. 154(b) by 0 days.

(21) Appl. No.: 18/002,285

(22) PCT Filed: Jun. 26, 2020

(86) PCT No.: PCT/NL2020/050423
§ 371 (c)(1),
(2) Date: Dec. 19, 2022

(87) PCT Pub. No.: WO2021/261990
PCT Pub. Date: Dec. 30, 2021

(65) Prior Publication Data
US 2023/0347619 A1    Nov. 2, 2023

(51) Int. Cl.
*B32B 3/18* (2006.01)
*B29C 63/04* (2006.01)
*B32B 3/04* (2006.01)
*B32B 3/26* (2006.01)
*B32B 7/03* (2019.01)

(52) U.S. Cl.
CPC ............... *B32B 3/18* (2013.01); *B29C 63/04* (2013.01); *B32B 3/04* (2013.01); *B32B 3/266* (2013.01); *B32B 7/03* (2019.01); *B32B 2250/44* (2013.01)

(58) Field of Classification Search
CPC .... B32B 3/18; B32B 7/03; B32B 3/04; B32B 3/266; B32B 2250/44; B29C 63/04
See application file for complete search history.

(56) References Cited

U.S. PATENT DOCUMENTS 4,411,939 A * 10/1983 Hawkins ................... B32B 5/06
                                                              428/218
9,314,977 B2 * 4/2016 Peeters ............. B29C 45/14065

FOREIGN PATENT DOCUMENTS

| WO | 90/09880 A1 | 9/1990 | |
| WO | WO-9009880 A * | 9/1990 | ............. B29C 70/30 |
| WO | 0147706 A1 | 7/2001 | |
| WO | 2010008293 A2 | 1/2010 | |

* cited by examiner

*Primary Examiner* — Catherine A. Simone
(74) *Attorney, Agent, or Firm* — Ipsilon USA—NLO

(57) ABSTRACT

A composite panel (20), which comprises multiple rows of cores (40) and sheets (60). The core rows (40) extend co-directionally along a first direction (X) and are arranged in an array along a second direction (Y). Each sheet row (60) is formed by a sequence of sheets (62) that extend in line along the first direction, and is arranged in-between two adjacent core rows along the second direction. The sheets are folded into U-shapes or Z-shapes around respective adjacent cores, and the sheets within the same sheet row (60) have leading and trailing edges (70, 72) that abut against or overlap with directly preceding sheets of the same sheet row.

15 Claims, 11 Drawing Sheets

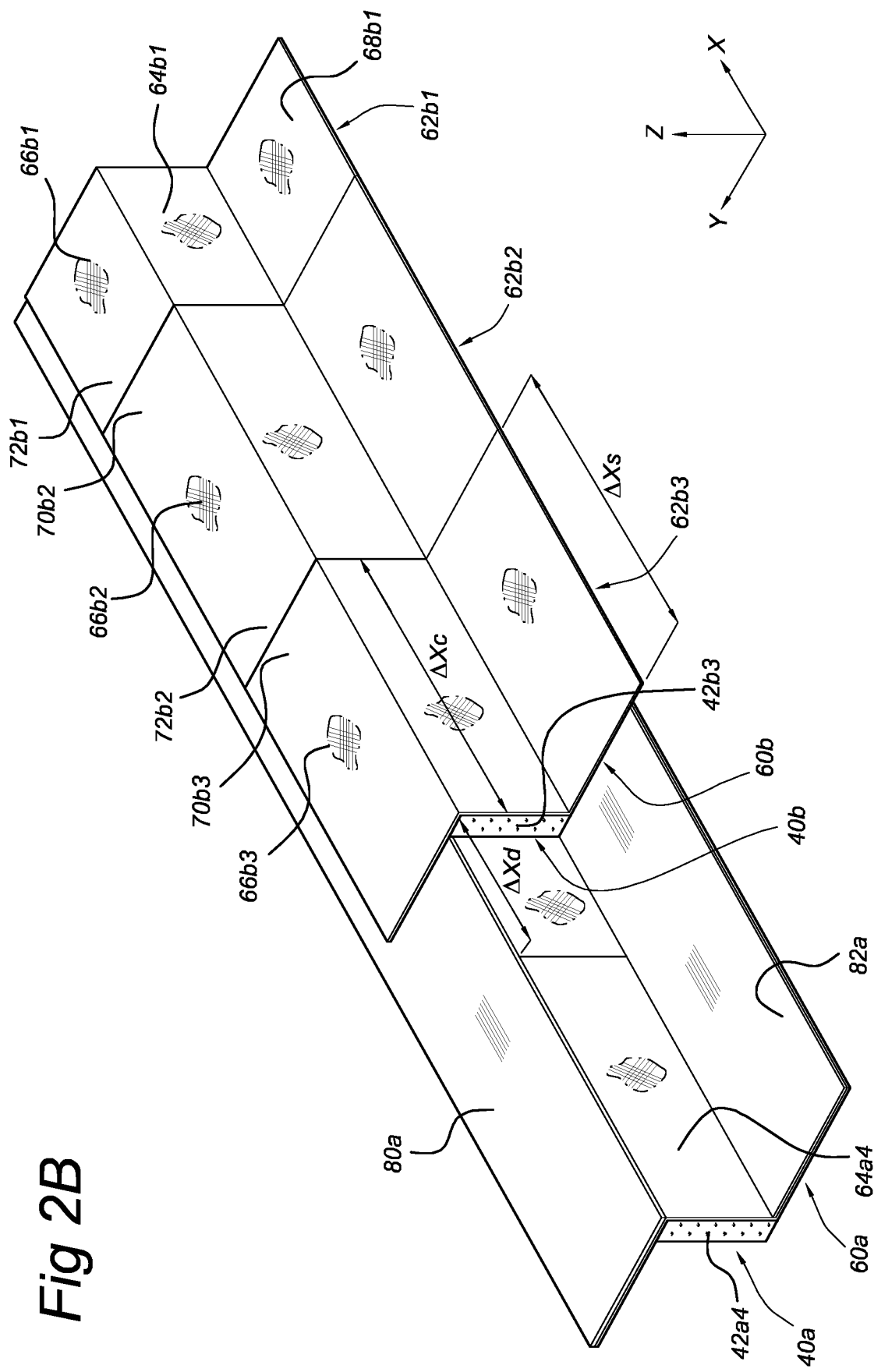

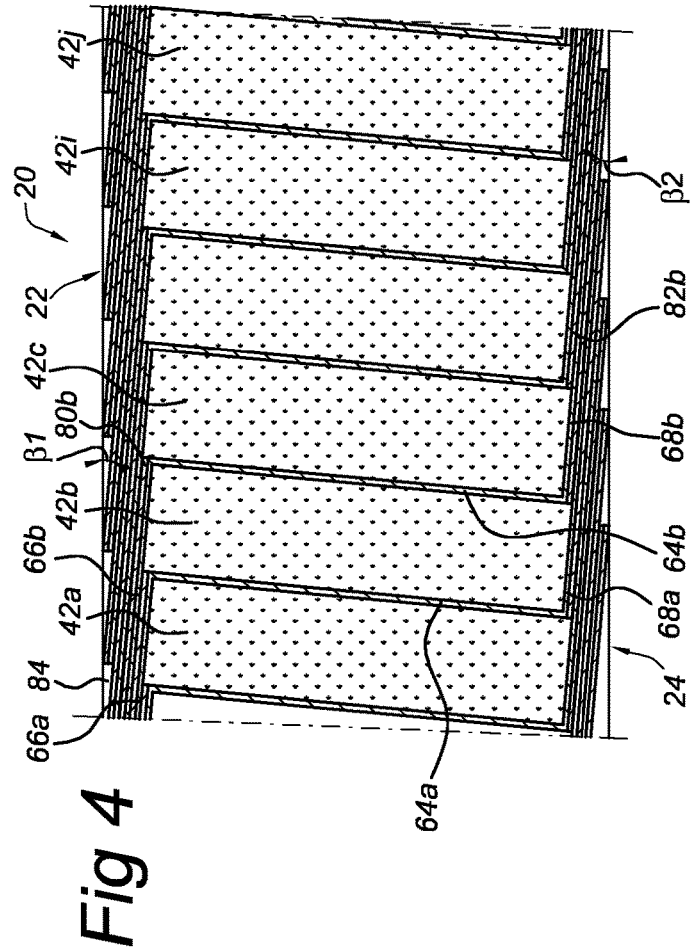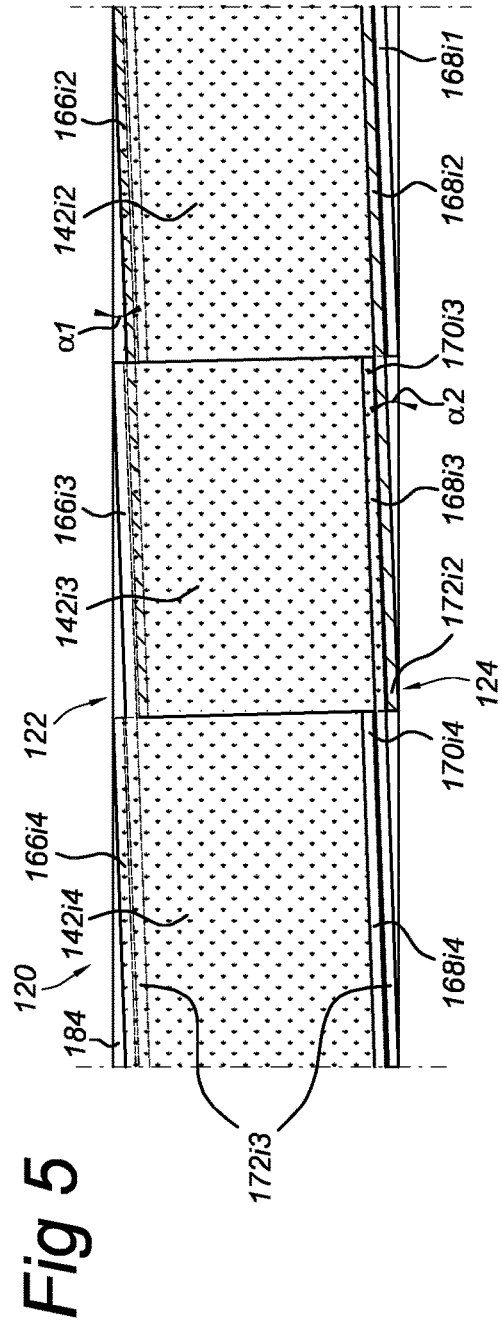

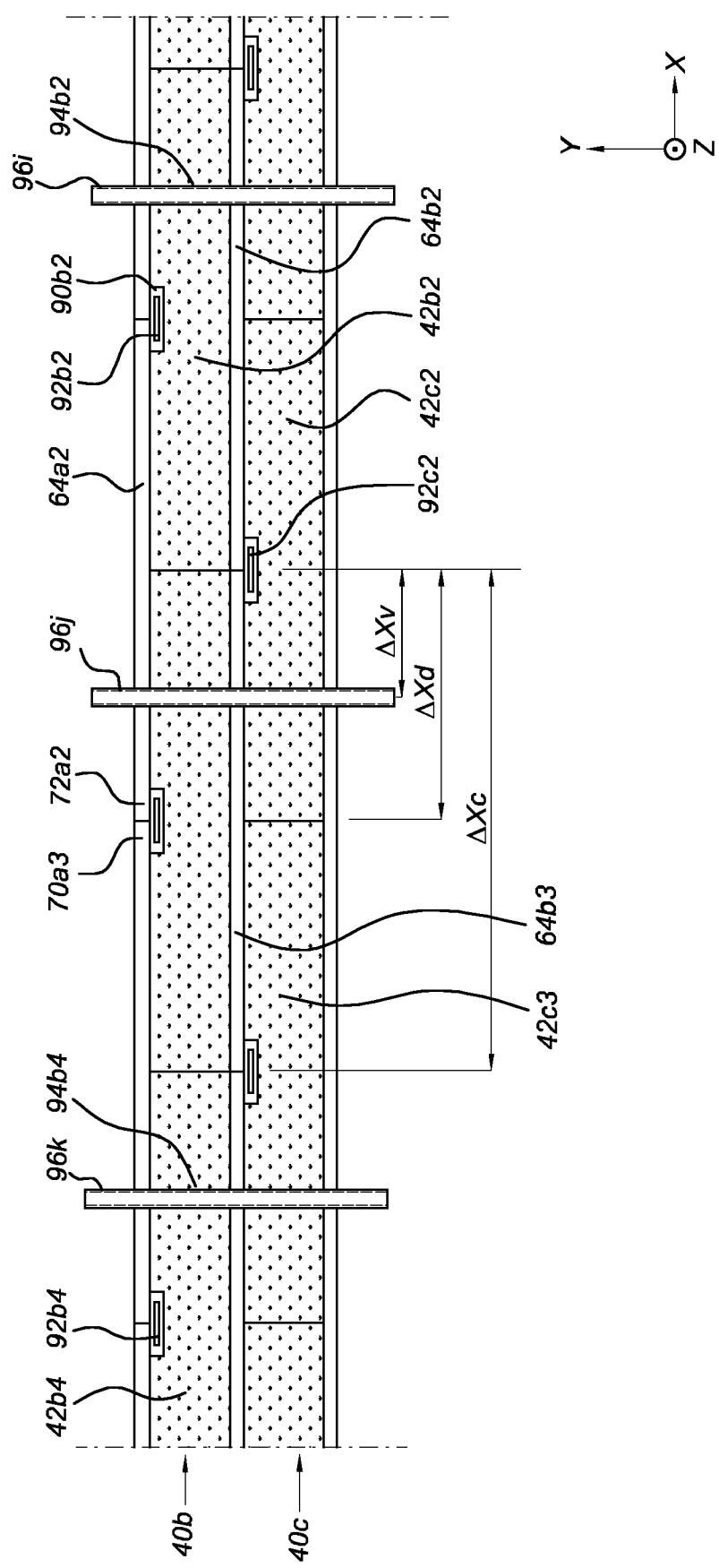

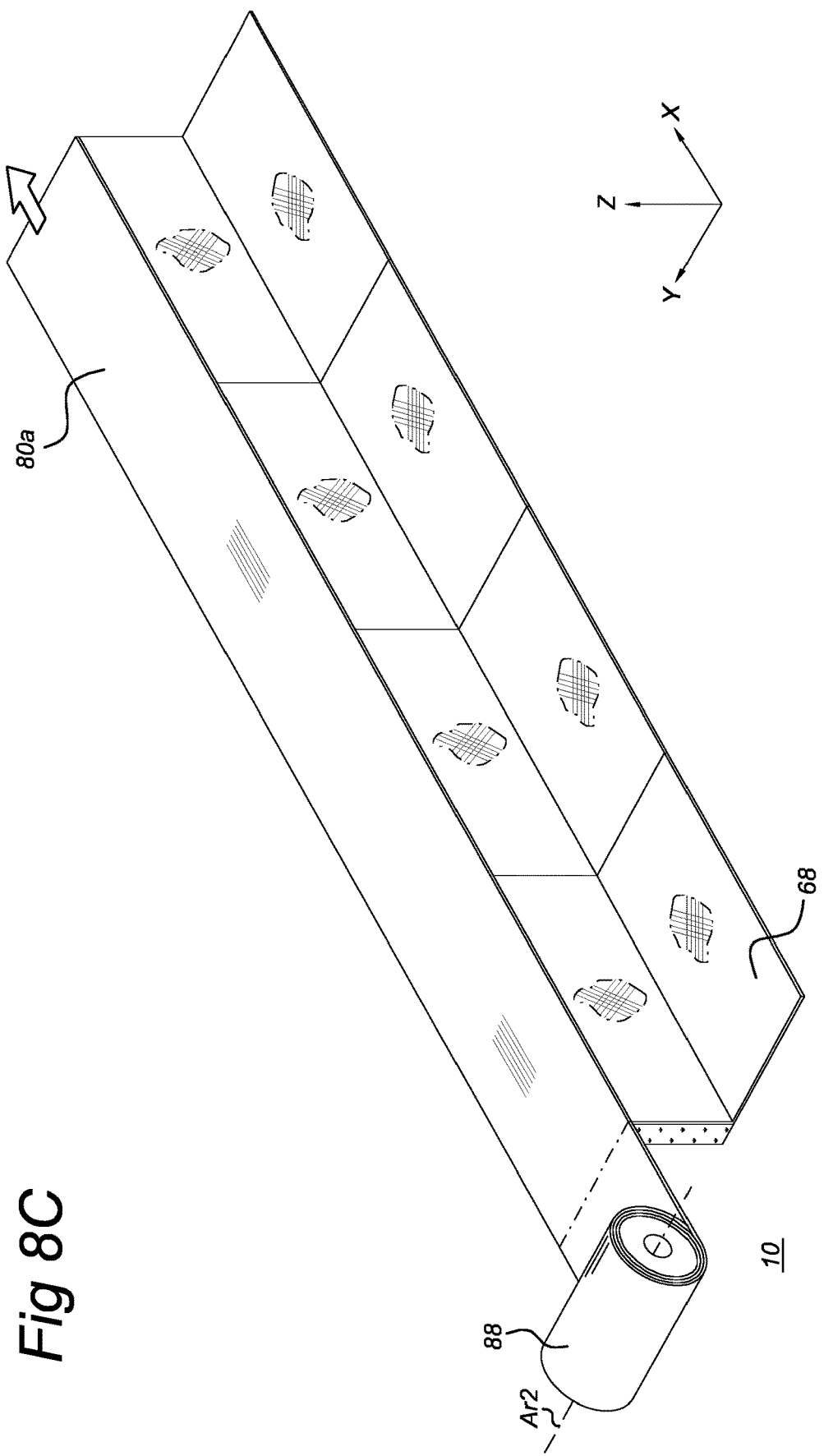

COMPOSITE STRUCTURE, AND METHODS FOR ARRANGING WEBS AND CORE ELEMENTS IN MANUFACTURING OF A COMPOSITE STRUCTURE

TECHNICAL FIELD

The invention relates to a composite structure with an array of core elements and interposed sheets. Furthermore, the invention relates to a method for producing such a composite structure.

BACKGROUND ART

Panels are known which are particularly suitable for supporting heavy objects. Such a panel has to be sufficiently strong to be able to carry its own weight as well as the objects it supports, and has to have a support surface that is resistant to wear from friction and impact by falling objects.

Patent document WO90/09880A1 describes a reinforced plastic panel formed by an assembly of elongated foam cores that are arranged in parallel, and by fiberglass mat strips that extend vertically between and continue horizontally above and below adjacent foam cores. A cover web of fiberglass is wrapped around the assembly and impregnated with resin. This known method of manufacturing a composite panel requires strips, foam cores, and cover webs with specific predetermined dimensions.

It would be desirable to provide methods for manufacturing composite structures that allow more design flexibility and allow the mechanical characteristics of the resulting structure to be tailored to various external preconditions.

SUMMARY OF INVENTION

Therefore, according to a first aspect of the invention, there is provided a composite structure (for instance a panel), formed of a plurality of core elements and sheets. The core elements form elongated core rows, each core row extending along a first direction X, and the core rows being adjacently arranged in a sequence along a second direction Y. The sheets form sheet rows, these sheet rows being arranged in a sequence along the second direction, with individual sheet rows extending in-between as well as across the core rows. The sheets define first, medial, and second sheet portions. The medial portion is interposed between two adjacent core rows, and extends with a component along a third direction Z, this direction being transverse to the first and second directions. The first lateral portion continues from one side of the medial portion, and is folded predominantly towards the second direction over a first one of the two adjacent core rows. The second lateral portion continues from an opposite side of the medial portion, and is either folded predominantly towards the second direction over the first one of the two adjacent core rows, or folded predominantly towards a negative second direction −Y over another one of the two adjacent core rows. The sheet rows include a first sheet row that comprises a first sheet and a second sheet at consecutive positions along the first direction. The second sheet has a leading edge that abuts or overlaps a trailing edge of the first sheet in the first direction.

The sequences of sheet rows form U-shapes in cross-section (in YZ-planes and when viewed along longitudinal direction X) when the second lateral portions are folded towards the positive transverse direction +Y, or form Z-shapes in cross-section (in YZ-planes viewed along X) when the second lateral portions are folded towards the negative transverse direction −Y. Patent document WO2010/008293A2 describes exemplary arrangements of overlapping sheets having Z-shaped or U-shaped cross-sections in YZ-planes, which the individual sheets in the sheet rows of the present invention may also assume.

The term "sheet" is used herein to generally refer to a flat piece of material that is thin in comparison to its length and width dimensions (e.g. having length and width dimensions that are at least two orders of magnitude larger than its thickness). The sheets preferably have quadrilateral shapes, and more preferably rectangular shapes. By composing individual sheet rows from distinct sheets and allowing sheets within the same sheet row to abut or overlap each other along their leading and trailing edges, the amount of overlap between sheets within the same row and between sheets of adjacent rows can be adapted at will, either locally or uniformly, in order to tailor the mechanical properties of the composite structure as needed.

The sheets in the composite structure according to this aspect may be formed from materials that are sufficiently rigid to be self-supporting, but ductile (i.e. plastically deformable without tearing or breaking) so that the sheet can be bent or folded along desired folding lines when subjected to sufficient force, while leaving other regions of the sheet dimensionally stable when subjected to loads associated with normal use of the composite structure. For example, initially rigid sheet materials may consist essentially of metal (e.g. aluminium or steel), a thermoplastic, or the like.

Alternatively, the sheet material may initially be highly flexible to allow folding into a predetermined configuration on a mould or other support surface during manufacturing of the composite structure. The manufacturing of such a composite structure should involve a hardening stage for the sheets, to allow the sheets to settle in essentially fixed orientations within the resulting composite structure. Such a hardening stage may for example include impregnation of the sheets by a liquid resin, followed by curing of the resin to form a rigid matrix in which the sheet material is embedded. Impregnation of the sheets may for example occur via vacuum assisted resin infusion moulding (RIM) or resin transfer moulding (RTM) of the formed profiled sheet arrangement. Initially flexible sheet material may for example consist essentially of a fabric (e.g. a web, mesh, or mat) of fibre material, which may be formed by continuous fibers (e.g. as mono-filament fibers, or yarns/twines of fibers) that are interlocked/interlaced and extending with their direction of elongation predominantly along sheet surface. Such fibre fabric materials are typically supplied on a roll having a width selected from a finite set of standardized widths. Composing the sheet rows from sheets that mutually abut or overlap along their leading and trailing edges allows the sheets to be taken from the roll in a direction perpendicular to the first direction, and allows the sheets to be cut at any desired length while minimizing or even eliminating waste of sheet material.

Alternatively, the individual sheets may be impregnated and shaped in advance ("prepreg sheets"), followed by stacking and bonding the sheets to form a profile. In yet another alternative, the sheets may be impregnated directly prior to the arrangement of the sheets into the intended profile e.g. via an immersion bath. In yet alternative implementations, composite constructions with both initially rigid sheets and initially flexible sheets may be used, for example, glass reinforced aluminium laminate structures.

The elongated core rows in the resulting composite structure help in defining the shape during construction, and confer additional stiffness to the composite structure. The core rows extend predominantly co-directionally (and preferably mutually parallel) along the first direction and are adjacently arranged in a sequence along the second direction Y. Respective ones of the core rows may be formed by sequences of consecutive and mutually abutting core elements. The core rows/elements may for example be formed of a rigid lightweight material, like polyurethane foam.

According to an embodiment, sheets in one sheet row directly overlap preceding sheets in the same sheet row, viewed in the first direction. Here, respective leading edges of the sheets in the first sheet row individually overlap in the first direction with respective trailing edges of preceding sheets in the first sheet row, thereby forming an imbricated sequence of tilted sheets. Preferably, each of the sheets in the same sheet row directly overlaps a preceding sheet in the first direction, with the exception of the initial sheet in this row.

The term "overlap" and the phrase "A overlaps (with) B" are used herein to indicate that part or all of object A extends over and covers at least a part or all of object B. Furthermore, the expression "A overlaps (with) B in/along direction Q" is used herein to indicate that A extends in the above-mentioned manner over part or all of B along the Q-direction. As a result, object A (partly) covers object B if viewed along at least one direction perpendicular to Q. The overlap of objects A and B may but does not necessarily imply that A and B are in direct physical contact. The overlap defines a reciprocal spatial relation, in that "A overlaps B" also implies that "B overlaps A".

In a further embodiment, the first lateral portions of the sheets in the first sheet row are tilted at a first angle α1 in a range 0°<α1<5° about the second direction and with respect to the first surface. Alternatively or in addition, the second lateral portions of the sheets in the first sheet row are tilted at a second angle α2 in a range 0°<α2<5° about the second direction and with respect to the second surface.

Letting the sheets in the same row overlap while tilting them at relatively small but non-zero angles α1, α2 relative to the outer surfaces confers good strength properties upon the composite structure. Angles α in a range |α1|,|α2|≤2° provide a good balance between strength of the structure and combined thickness of the overlapping sheets.

In embodiments, the first lateral portions of the sheets are tilted at a third angle β1 in a range 0°<β1<5° about the first direction and with respect to the first surface. In the case of U-shaped sheet rows, the second lateral portions of the sheets may alternatively or in addition be folded predominantly towards the second direction and tilted at a fourth angle β2 in a range −5°<β2<0° about the first direction with respect to the second surface. In the case of Z-shaped sheet rows, the second lateral portions of the sheets may alternatively or in addition be folded predominantly towards the negative second direction −Y and tilted at a fourth angle β2 in a range 0°<β2<5° about the first direction X with respect to the second surface.

Letting the first and/or second lateral portions in subsequent sheet rows overlap while tilting them at relatively small but non-zero angles β1, β2 relative to the outer surfaces confers good strength properties upon the composite structure. Angles β in a range |β1|,|β2|≤2° provide a good balance between strength of the structure and combined thickness of the overlapping sheets. In the case that the first and second surfaces of the composite structure are essentially mutually parallel, and the widths of the first and second lateral portions along the second direction are substantially identical, the third and fourth angles β1, β2 will be essentially identical β1≈β2.

In embodiments, a length ΔXo of the overlap between leading edges of respective sheets and trailing edges of preceding sheets in the first sheet row approximately equals half a sheet length ΔXs. Both the overlap length and the sheet length are defined along the first direction. By letting ΔXo≈0.5·ΔXs for all sheets in the same sheet row, the combined thickness of the overlapping sheets will remain constant (i.e. 2 layers) along the entire row.

In an alternative embodiment, respective leading edges of the sheets in the first sheet row individually abut against respective trailing edges of preceding sheets in the first sheet row, without overlapping in the first direction. The first sheet row thus forms a continuous sequence of sheets, in which the medial portions are mutually level, the first lateral portions are mutually level, and the second lateral portions are mutually level. For instance, all of the sheets in the same sheet row may abut a preceding sheet in the first direction, with the exception of the initial sheet.

In embodiments, the sheet rows include a second sheet row that is distinct from but adjacent to the first sheet row, viewed along the second direction. The second sheet row includes a third sheet having a first lateral portion that overlaps the leading edge at the first lateral portion of the second sheet and simultaneously overlaps the trailing edge at the first lateral portion of the first sheet. In a similar manner, the second lateral portion of the third sheet may overlap the leading edge at the second lateral portion of the second sheet and simultaneously overlap the trailing edge at the second lateral portion of the first sheet. This applies to both a sequence of U-shaped sheet rows and a sequence of Z-shaped sheet rows (although the vertical ordering of the overlapping layers differs between these cases).

The overlap by a first and/or second sheet portions and mating edges between adjacent sheet rows may be implemented locally or across the entire structure. The resulting staggered arrangement of sheets between subsequent rows is stronger, for it avoids creating edge lines that continue in the second direction across multiple sheet rows along the outer surface of the panel.

Each core row may be formed by a sequence of core elements that are arranged in line and mutually abut in the first direction, and wherein the medial portion of an associated sheet is interposed between two adjacent core elements of adjacent core rows. The first lateral portion of said sheet is folded away from the medial portion over one of the two adjacent core elements and predominantly towards the positive second direction +Y. The second lateral portion of said sheet is folded away from the medial portion over the one of the two adjacent core elements and predominantly towards the positive second direction. Alternatively, the second lateral portion is folded away over the other of the two adjacent core elements and predominantly towards the negative second direction −Y.

The individual sheets in the sheet rows have lengths ΔXs, and the core elements have core lengths ΔXc, both defined along the first direction. The sheet lengths ΔXs may be substantially identical to the core lengths ΔXc. Alternatively, the core lengths ΔXc may be equal to about half the sheet lengths ΔXs. All core elements may have substantially equal core lengths ΔXc. Alternatively or in addition, the sheets may have substantially equal sheet lengths ΔXs.

The core elements of a core row may be offset at non-zero distances ΔXd in the first direction with respect to core elements of a directly adjacent core row.

In further embodiments, at least one of the core elements in the second core row is a recessed core element that is positioned against medial portions of the first and second sheets in the first sheet row. The recessed core element defines a recess at a surface of the core element that faces in the second direction and towards the medial portions. This recess accommodates a patch of impregnatable material, and faces and extends along a mating line where the leading edge of the second sheet and the trailing edge of the first sheet abut or overlap, so that the patch directly covers said mating line.

The patch of impregnatable material covers the mating line between adjoining medial sheet portions of sheets in the same sheet row. During moulding, liquid moulding material (e.g. resin) may be supplied into the recess and absorbed by the patch. After curing of the assembly, the patch will form a mechanical the bond between the adjoining medial sheet portions, which increases the strength of the resulting structure.

In alternative embodiments, at least one of the core elements comprises a wrap of impregnatable sheet material, which extends directly around the core element. This core element is positioned against medial sheet portions of sheets in the first sheet row, with a portion of the wrap directly covering a mating line where the leading edge of the second sheet and the trailing edge of the first sheet abut or overlap.

The composite structure may include one or more strips, which extend along core rows in the first direction. Each such strip may be sandwiched between the first lateral portions of sheets in one sheet row on one side, and the first lateral portions of sheets in a directly adjacent sheet row on the other side.

In addition, the composite structure may include one or more further strips, which also extend along core rows in the first direction. Each such further strip may be sandwiched between the second lateral portions of sheets in one sheet row on one side, and the second lateral portions of sheets in a directly adjacent sheet row on the side.

The strip(s) and/or further strip(s) may consist essentially of one of a sheet of fibre-reinforced plastic, a solid or perforated body of plate material, or a composite material. If fibre sheets are used, direction of fibres in strip preferably different from direction of fibres in sheets. The strips may for instance be formed by unidirectional fibre composite material, having an along-fibre modulus of elasticity that exceeds 35 gigapascal (GPa) or preferably exceeds 100 GPa, and an along-fibre tensile strength that exceeds 800 megapascal (MPa) or preferably exceeds 1200 MPa. Exemplary strip materials are unidirectional glass fibre composite (E-modulus strip≈39 GPa, tensile strength≈900 MPa), unidirectional high strength carbon fibre composite (E-modulus strip≈120 GPa, tensile strength≈1900 MPa), or unidirectional high modulus carbon fibre composite (E-modulus strip≈330 GPa, tensile strength≈1300 MPa).

In embodiments, the core elements are provided with through holes, each through hole extending entirely through a corresponding core element in the second direction. The through holes in adjacent core elements of core rows that are directly adjacent in the second direction are interconnected to form a passageway for conveying liquid resin, or for accommodating a conduit for conveying liquid resin. This passageway or conduit can conveniently be used for distributing the liquid resin during RIM or RTM.

The through hole may be positioned at a longitudinal distance $\Delta Xv$ from an edge of the core element, this longitudinal distance being defined by $\Delta Xv = \frac{1}{2} \cdot \Delta Xc - \frac{1}{2} \cdot \Delta Xd$. Preferably, $\Delta Xd = \frac{1}{2} \cdot \Delta Xc$, so that $\Delta Xv = \frac{1}{4} \cdot \Delta Xc$.

In embodiments, outer contours of the core rows and/or the core elements viewed in cross-sectional planes perpendicular to the first direction have mirror symmetry and/or discrete rotational symmetry.

For instance, the core rows and/or core elements may be shaped as geometric prisms, with polygonal cross-sections preferably selected from the group of triangular, quadrilateral, pentagonal, and hexagonal shapes, more preferably selected from the subgroup of regular triangular or rectangular shapes.

In embodiments, the composite structure may have a concave shape with a smooth curvature in a third direction as a function along the first direction. These first and third directions are substantially perpendicular to the second direction.

In a second aspect, and in accordance with the advantages and effects described herein above, there is provided a reinforced construction that includes a composite structure according to the first aspect. This construction may for instance be a bridge, a bridge deck, a lock gate, a support platform in an offshore structure, a turbine blade, or a wing.

In a third aspect, and in accordance with the advantages and effects described herein above, a method for producing a composite structure is provided. The method comprises:
  positioning core elements on a base, thereby forming elongated core rows that extend along a first direction and are arranged mutually adjacent into a sequence along a second direction;
  positioning sheets in abutting or overlapping sequences on the base, to form sheet rows that arranged in a sequence along the second direction, each sheet row extending predominantly along the first direction.

The positioning of the sheets and core elements includes:
  interposing a medial portion of a sheet between two adjacent core rows, so that the medial portion extends with a component along a third direction transverse to the first and second directions;
  folding a first lateral portion, which continues from one side of the medial portion, predominantly towards the second direction over a first one of the two adjacent core rows;
  folding a second lateral portion, which continues from an opposite side of the medial portion, predominantly towards a positive second direction +Y over the first one of the two adjacent core rows, or predominantly towards a negative second direction −Y over another one of the two adjacent core rows, and
  positioning a leading edge of the sheet in an abutting or overlapping arrangement with a trailing edge of a preceding sheet in the same sheet row along the first direction.

The method may further include positioning of the sheets into a sheet arrangement, such that the first and second lateral sheet portions laterally extend above and below the core rows in an overlapping manner, and that first and second lateral portions of adjacent sheet rows at least partly cover each other on the first and second panel surfaces, to jointly form outer skins along these surfaces.

The forming of core rows on the base may for example comprise the positioning of core elements on the base in abutting sequences along the first direction, resulting in core rows that are predominantly co-directional and preferably mutually parallel. The interposing of medial portions of sheets may then comprise interposing each respective medial portion between two adjacent core elements of directly adjacent core rows. In connection to this, the folding of first lateral portions of the sheets may then comprise folding each respective first lateral portion away from its medial portion over one of the two adjacent core elements, and predominantly towards a positive second direction. Also, the folding of second lateral portions of sheets may then comprise folding each respective second lateral portion away from its medial portion over the one of the two adjacent core elements, and predominantly towards the positive second direction, or over the other of the two adjacent core elements, and predominantly towards a negative second direction.

In an embodiment, the positioning of the sheets includes:
providing a roll comprising sheet material that is rolled up around a roll axis;
positioning the roll at a first position relative to the base, with the roll axis predominantly parallel with the first direction;
obtaining and positioning a first sheet by moving and unrolling the roll and positioning the first sheet relative to the base along the second direction, and cutting the first sheet from the roll;
moving the roll along the first direction over a sheet translation distance relative to the base, to a second position wherein the roll axis is predominantly parallel with the first direction, and
obtaining and positioning a second sheet by unrolling the roll while positioning the sheet relative to the base along the second direction, and cutting the second sheet from the roll.

In further embodiments, the method may include:
providing a further roll comprising sheet material that is rolled up around a further roll axis;
positioning the further roll at a third position relative to the base, with the further roll axis predominantly parallel with the second direction;
obtaining and positioning a strip by moving and unrolling the further roll and positioning the strip relative to the base along the first direction, thereby covering first lateral sheet portions or second lateral sheet portions of the same sheet row, and cutting the strip from the further roll.

In a fourth aspect, an alternative method for producing a composite structure is provided. This method includes:
providing pre-formed core-and-sheet units, each comprising a core element and a sheet attached thereto;
forming a first row of first core-and-sheet units along a first direction on a base, including positioning individual first core-and-sheet units with a leading edge of the sheet in an abutting or overlapping arrangement with a trailing edge of a preceding sheet of the same row, to form an abutting or overlapping sequence of first core-and-sheet units along the first direction, and
forming adjacent rows of further core-and-sheet units along the first direction on the base, including positioning individual further core-and-sheet units in the same row with a leading edge of its sheet in an abutting or overlapping arrangement with a trailing edge of a preceding sheet in the same row, to form an abutting or overlapping sequence of further core-and-sheet units along the first direction.

In embodiments, forming of the first row of first core-and-sheet units includes:
folding first lateral portions of the first core-and-sheet units away from the medial portions and towards a positive second direction over the core elements of the first core-and-sheet units;
folding second lateral portions of the first core-and-sheet units away from their medial portions and towards a negative second direction;
positioning the first lateral portions on the base;
In addition, forming of an adjacent row of second core-and-sheet units comprises:
folding second lateral portions of the second core-and-sheet units away from the medial portions and towards the negative second direction;
positioning the second lateral portions of the second core-and-sheet units on the second lateral portions of the first core-and-sheet units;
interposing core elements of the second core-and-sheet units between the medial portions of the first core-and-sheet units and the medial portions of the second core-and-sheet units, and
folding first lateral portions of the second core-and-sheet units away from the medial portions and predominantly towards the positive second direction over the core elements of the second core-and-sheet units and over the first lateral portions of the first core-and-sheet units.

In alternative embodiments, forming of the first row of first core-and-sheet units includes:
folding first lateral portions of the first core-and-sheet units away from the medial portions and towards a positive second direction;
folding second lateral portions of the first core-and-sheet units away from the medial portions and towards a negative second direction, and under the core elements of the first core-and-sheet units;
positioning the first lateral portions on the base; In addition, forming of an adjacent row of second core-and-sheet units comprises:
folding second lateral portions of the second core-and-sheet units away from the medial portions and towards the negative second direction;
positioning the second lateral portions of the second core-and-sheet units on the second lateral portions of the first core-and-sheet units;
interposing the medial portions of the second core-and-sheet units between the core elements of the first core-and-sheet units and the core elements of the second core-and-sheet units, and
folding first lateral portions of the second core-and-sheet units away from the medial portions and predominantly towards the positive second direction over the core elements and the first lateral portions of the first core-and-sheet units.

Each one of the methods according to the above aspects may involve resin transfer moulding or resin infusion moulding. In this case, the base constitutes or is part of a mould, and the sheets include fibre material. Such methods include:
impregnating the sheets with a hardenable substance, like a resin;
causing the hardenable substance to cure to form the composite structure, thereby mutually fixing the overlapping first lateral portions and the overlapping second lateral portions of the sheets.

In alternative method embodiments, the sheets may already be provided in advance in the form of prepreg sheets or rigid structures, which may then be followed by fixing the sheets to each other in the described arrangement by suitable methods, which may be selected on the basis of the sheet material used, e.g. by using adhesive, welding, riveting, or fusion bonding.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include letters and numbers appended to the element number. For example, two specific instances of a particular element "42" may be labelled with appended letters and numbers, e.g. as "42$a$1" and "42$b$2". The element label may be used with an index i or j (e.g. "42$i$") to refer to an unspecified instance of the element, while the element label may be used without an appended letter (e.g. "42") to generally refer to every instance of the element.

FIGS. 2A and 2B present perspective views of an arrangement of sheets and cores in a panel according to an embodiment;

FIG. 4 schematically shows a transverse cross-sectional view of an embodiment of a composite panel;

FIG. 5 schematically shows a longitudinal cross-sectional view of another embodiment of a composite panel;

FIG. 6B schematically shows a vertical cross-sectional view of the arrangement in FIG. 6A;

FIGS. 8A-8C illustrate manufacturing stages of an embodiment of making a panel.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures. In the figures, Cartesian coordinates will be used to describe spatial relations for exemplary embodiments of the panel.

The term "surface" is used herein to generally refer to a two-dimensional parametric surface region, which may have an entirely or piece-wise flat shape (e.g. a plane or polygonal surface), a curved shape (e.g. cylindrical, spherical, parabolic surface, etc.), a recessed shape (e.g. stepped or undulated surface), or a more complex shape. The term "plane" is used herein to refer to a flat surface defined by three non-coinciding points.

Figure 1:
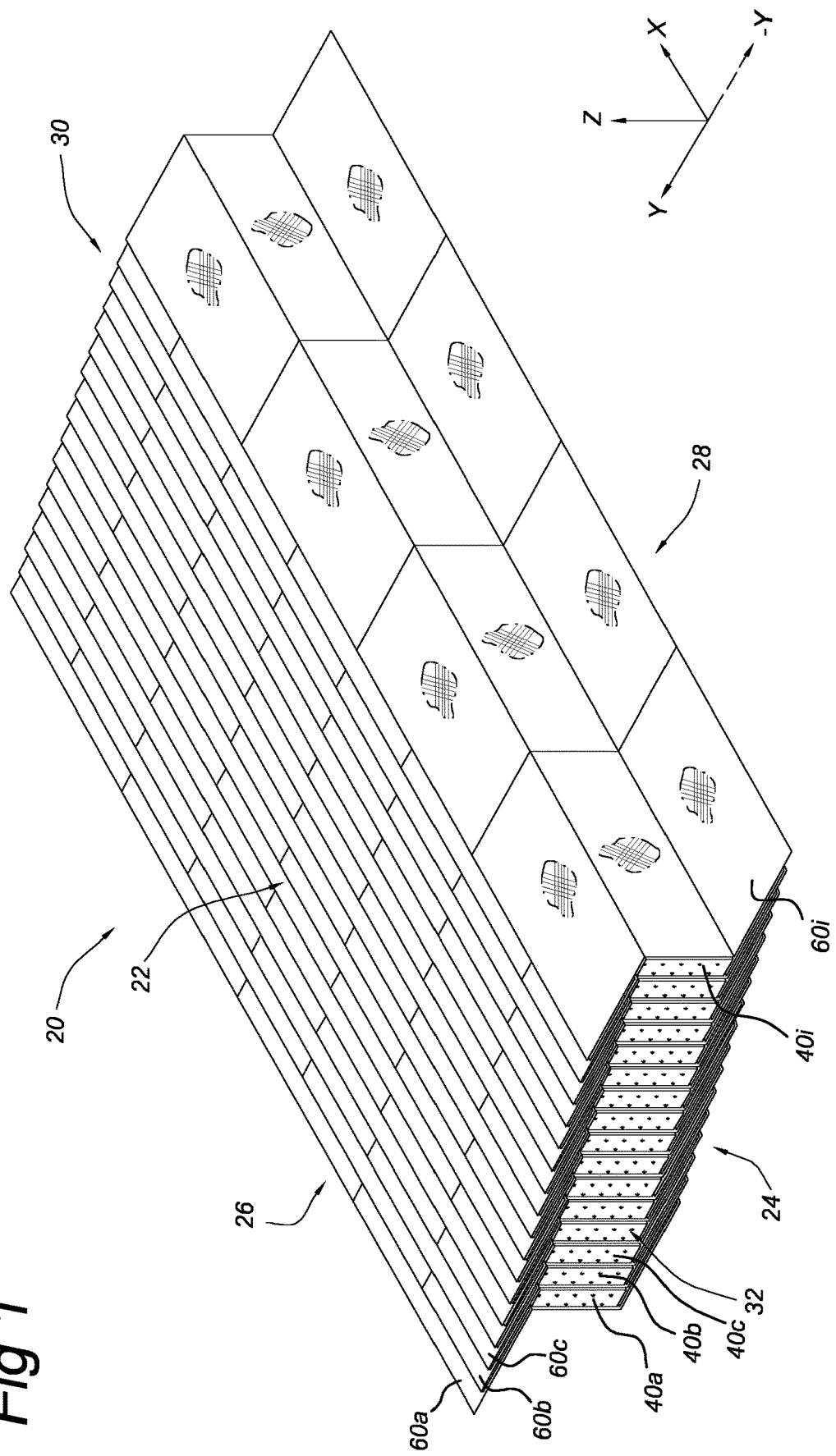
FIG. 1 schematically shows a perspective view of a portion of a composite panel according to an embodiment.

FIG. 1 schematically shows a perspective view of part of a composite panel 20 according to an embodiment. FIG. 1 shows that the panel 20 includes multiple core rows 40$a$, 40$b$, etc. and multiple rows of sheets 60$a$, 60$b$, etc. of fibre material. Other structures like reinforcing strips, cured impregnation material layers, internal conduits or recesses, and protective cover layers, may also be present. However, only rows of cores 40$i$ (index i=a, b, c . . . ) and rows of sheets 60$i$ are shown in FIG. 1, to illustrate the layout of the sheets with fibre material. The panel 20 defines a first surface 22 and a second surface 24 on opposite panel sides, which face the positive and negative vertical directions ±Z respectively. In this embodiment, the characteristic dimensions of the panel 20 in the longitudinal and transverse directions X, Y are substantially larger than in the vertical direction Z.

Each core row 40 has an elongated shape that extends along the longitudinal direction X. The core rows 40 are arranged mutually parallel along this longitudinal direction X, and are arranged mutually adjacent in an array along the transverse direction Y. In this example, each core row 40 has a rectangular cross-sectional shape in YZ-planes.

The sheets rows 60 also extend along the longitudinal direction X. Each sheet row 60 is formed by a sequence of sheets, which are positioned in a consecutive manner along the longitudinal direction X. The sheets in each row 60$i$ are interposed with medial portions between two directly adjacent core rows 40$i$, 40$i$+1, and continue with lateral portions above and below the core rows 40 in an overlapping manner, so that first and second lateral portions of adjacent sheet rows 60 at least partly cover each other on the first and second surfaces 22, 24 to jointly form outer skins along these surfaces 22, 24.

Figure 2A:
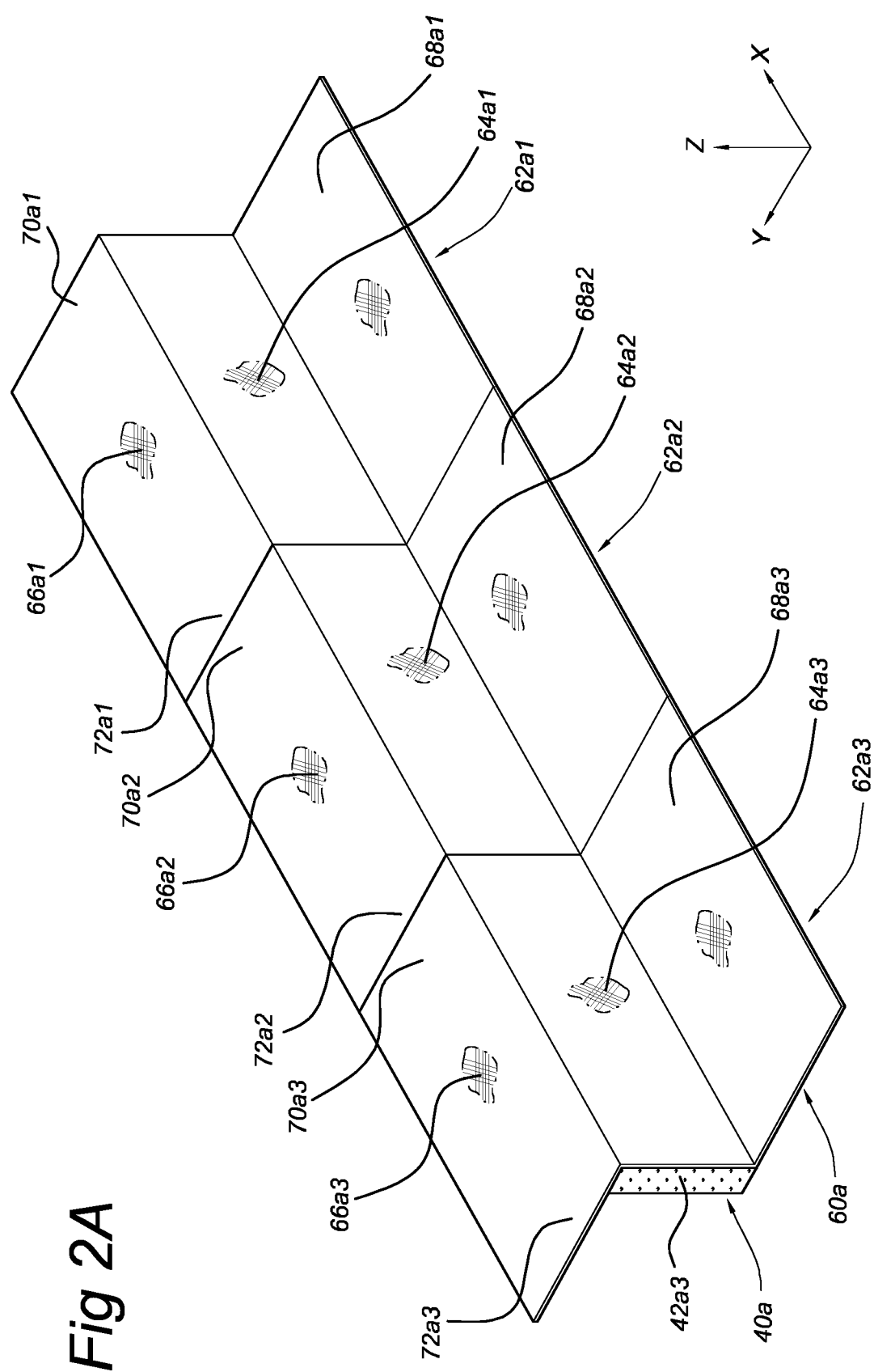

FIGS. 2A-2B illustrate in more detail the arrangement of sheets and cores in the exemplary panel 20 from FIG. 1. Each sheet row 60 is formed by a sequence of sheets 62, which are arranged in a consecutive abutting manner along the longitudinal direction X.

FIG. 2A illustrates only part of one core row 40$a$ with consecutive core elements 42$a$ (only 42$a$3 is shown), and one associated sheet row 60$a$ with consecutive sheets 62$a$1, 62$a$2, 62$a$3. In this example, the sheets 62$a$ in this sheet row 60$a$ mutually abut in the longitudinal direction X, so that leading edges 70$a$2, 70$a$3 (in positive longitudinal direction +X) of the sheets 62$a$2, 62$a$3 adjoin trailing edges 72$a$1, 72$a$2 (in negative longitudinal direction −X) of preceding sheets 62$a$1, 62$a$2, to form a continuous but non-overlapping sequence. Sheets 62 in other sheet rows 60 are arranged in a similar manner.

Each sheet 62 includes a medial portion 64, a first lateral portion 66, and a second lateral portion 68. The medial portion 64 is arranged along the associated core element 42. In this example, the first lateral portion 66 of each sheet 62 is folded away from the medial portion 64 towards a positive transverse direction +Y over the corresponding first adjacent core element 42, to extend along the first panel surface 22. In this example, the second lateral portion 68 of each sheet 62 is folded away from the medial portion 64 towards a negative transverse direction −Y, to extend predominantly along the second panel surface 24.

FIG. 2B illustrates the shifted arrangement of cores 42 and sheets 62 of adjacent core rows 40$a$, 40$b$ and sheet rows 60$a$, 60$b$ in more detail.

In this example, the core elements 42 have lengths $\Delta Xc$ relative to the longitudinal direction X, which are substantially identical for all core elements 42 in each of the rows 40. Similarly, the sheets 62 have lengths $\Delta Xs$ relative to the longitudinal direction X, which are substantially identical for all sheets 62 in each of the rows 60. Here, the core lengths $\Delta Xc$ are approximately equal to the sheet lengths $\Delta Xs$ (i.e. $\Delta Xc \approx \Delta Xs$).

In this example, the core elements 42$i$ in each core row 40$i$ (e.g. core elements 40$b$ in FIG. 2B) are offset at non-zero distances $\Delta Xd > 0$ in the longitudinal direction X relative to core elements 42$i$±1 of a directly adjacent core row 40$i$±1 (e.g. core elements 40$a$). Here, $\Delta Xd = \frac{1}{2} \cdot \Delta Xc$. Similarly, the sheets 62$i$ in each sheet row 60$i$ are shifted over distance $\Delta Xd$ relative to the sheets 62$i$±1 of a directly adjacent sheet row 60$i$±1.

FIG. 2B illustrates that the medial portions 64$i$-1 of sheets 62$i$-1 in one sheet row 60$i$-1 (e.g. row 60$a$) are arranged along and interposed between two directly adjacent core elements 42$i$-1, 42$i$. The first lateral portions 66$i$ of sheets 62$i$ in one sheet row 60$i$ (e.g. row 60$b$) at least partially overlap the first lateral portions 66$i$-1 of sheets 62$i$-1 in a preceding adjacent sheet row 60$i$-1 (e.g. row 60$a$), and are at least partially overlapped by the first lateral portions 66$i$+1 of sheets 62$i$+1 in a subsequent adjacent sheet row 60$i$+1. Similarly, the second lateral portions 68 of sheets 62 in adjacent sheet rows 60 are arranged in an at least partially overlapping manner.

FIG. 2B also illustrates that the panel 20 comprises various strips 80, 82 of reinforcing material. In this example, the strips 80, 82 are composed of a unidirectional fibre composite material having an along-fibre modulus of elasticity that exceeds 35 GPa and an along-fibre tensile strength that exceeds 800 MPa. The fibres in strips 80, 82 preferably extend in a direction that differs from the fibre direction in the sheets 62. The fibres in the strips 80, 82 may for instance extend along the longitudinal direction X, whereas the fibres in the sheets 62 may extend diagonally (indicated by small lines in FIG. 2B).

First strips 80 extend along the longitudinal direction X and near the first panel surface 22. Each strip 80$i$ (e.g. strip 80$a$) is sandwiched between the first lateral portions 66$i$ of sheets 62$i$ in a sheet row 60$i$ (e.g. row 60$b$) and the first lateral portions 66$i$-1 of sheets 62$i$-1 in the adjacent sheet row 60$i$-1 (e.g. row 60$a$). Each strip 80 extends across multiple first lateral portions 66 of sheets 62 in the same row 60.

Second strips 82 also extend along the longitudinal direction X, but near the second panel surface 24. Each strip 82$i$ (e.g. strip 82$a$) is sandwiched between the second lateral portions 68$i$ of sheets 62$i$ in a sheet row 60$i$ (e.g. row 60$b$) and the second lateral portions 68$i$-1 of sheets 62$i$-1 in the adjacent sheet row 60$i$-1 (e.g. row 60$a$). The second strips 82 extend across multiple second lateral portions 68 of sheets 62 in the same row 60.

Figure 3A:
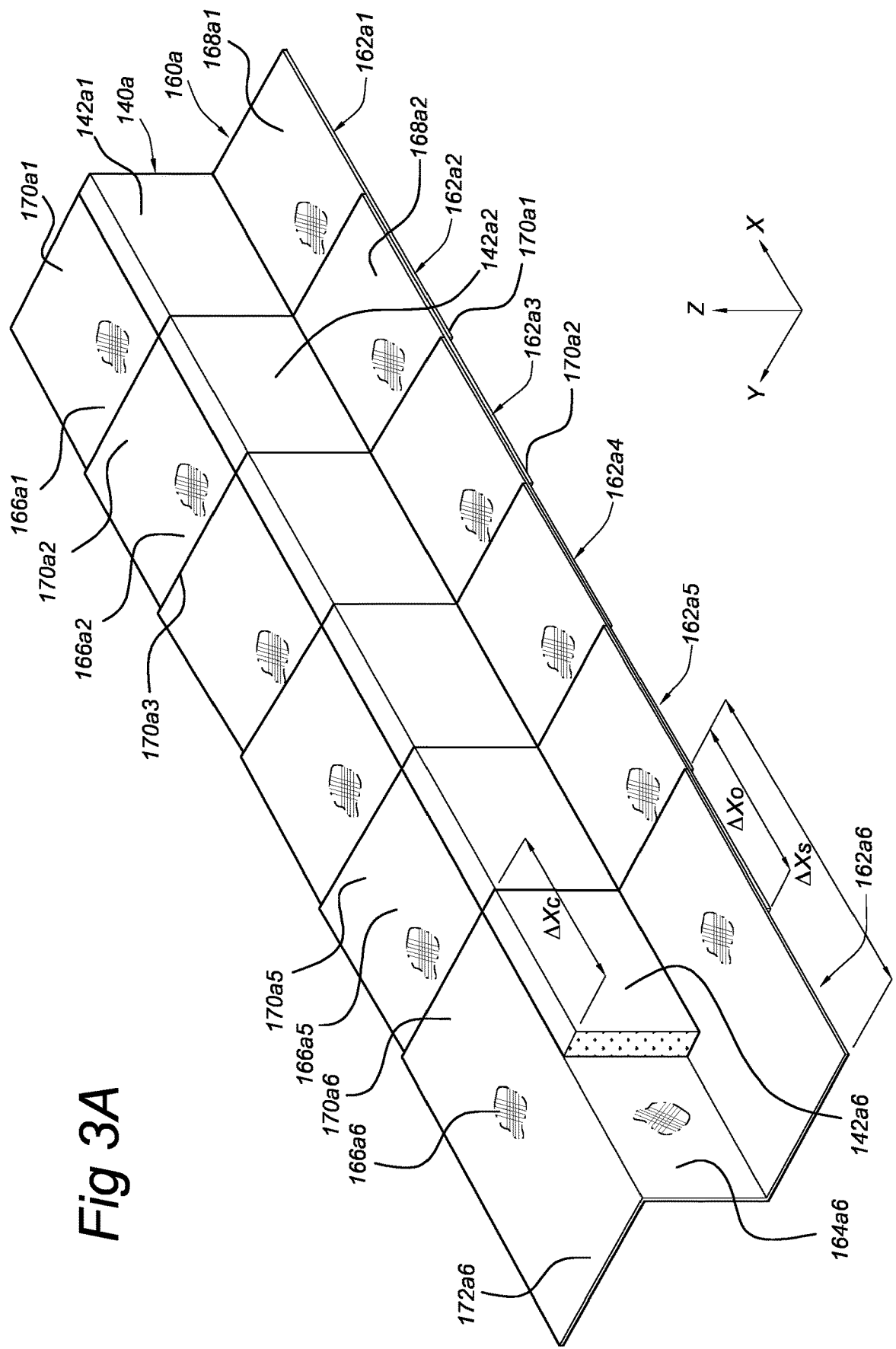
FIGS. 3A and 3B present perspective views of an alternative arrangement of sheets and cores in a panel according to another embodiment.
Figure 3B:
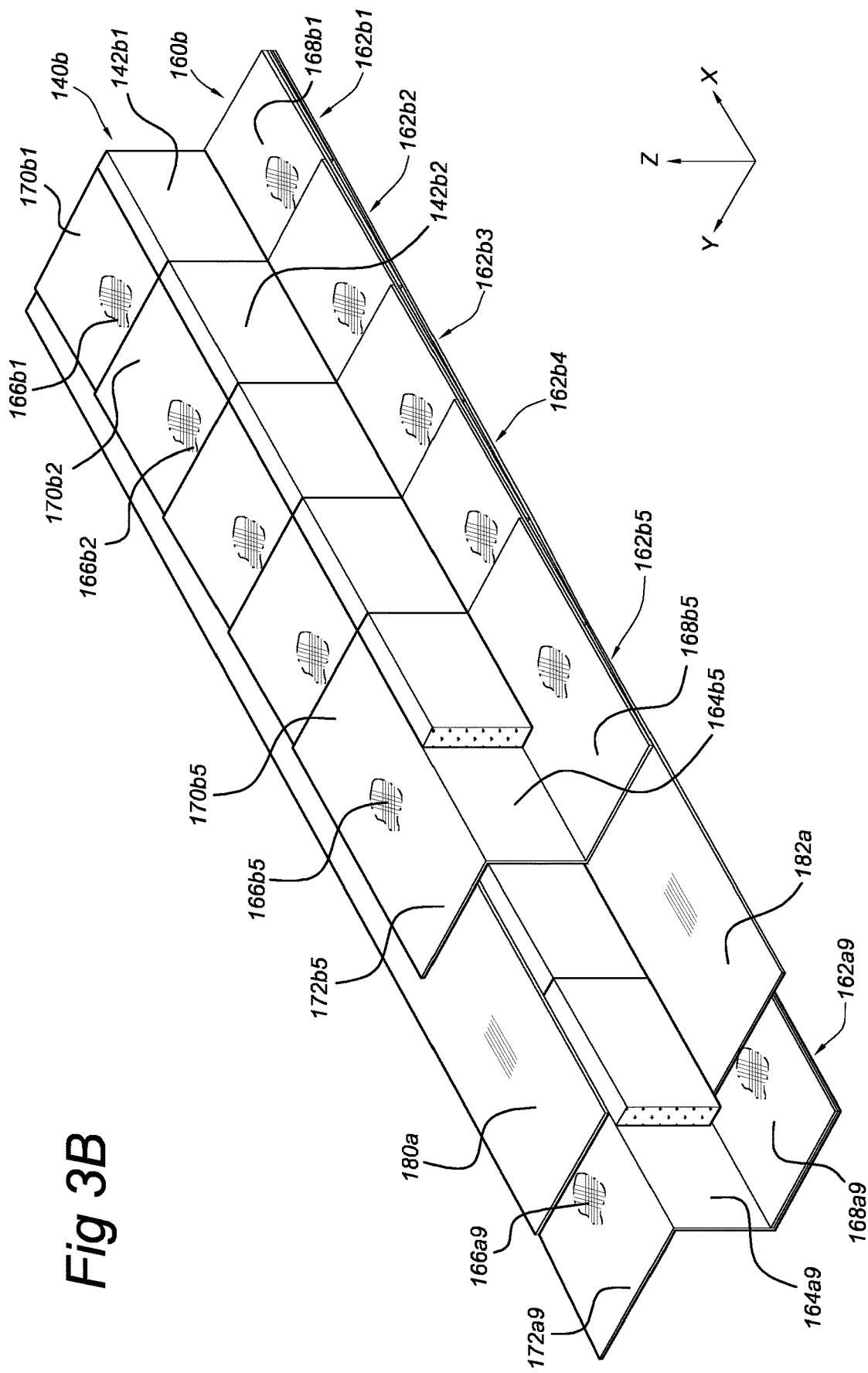

FIGS. 3A-B show an alternative arrangement of cores 142 and sheets 162, which is associated with another panel embodiment that is shaped similar to the panel 20 in FIG. 1. Features that have already been described above with reference to the panel 20 in FIGS. 1 and 2A-B may also be present in this panel embodiment, and will not all be discussed here again. For the discussion with reference to FIGS. 3A-B, like features are designated with similar reference numerals preceded by 100 to distinguish the embodiments.

FIG. 3A illustrates only part of one core row 140$a$ with consecutive core elements 142$a$, and one associated sheet row 160$a$ with consecutive sheets 162$a$. In this example, the leading edges 170$a$ of the sheets 162$a$ in this sheet row 160$a$ overlap in the longitudinal direction X with trailing edges 172$a$ of preceding sheets 162$a$ in this sheet row 160$a$, to form a continuous imbricated sequence. Sheets 162 in other sheet rows 160 are arranged in a similar manner.

In this example, the core elements 142 have lengths ΔXc relative to the longitudinal direction X, which are substantially identical for all core elements 142 in each row 140. The sheets 162 also have lengths ΔXs that are substantially identical for all sheets 162 in each row 160. In this case, the core lengths ΔXc are approximately half the sheet lengths ΔXs (i.e. ΔXc≈½·ΔXs). As the core elements 142 in each core row 140 are placed in an abutting sequence along the longitudinal direction X, a length ΔXo of overlap between adjacent sheets 162 in the same sheet row 160 and along the first direction X is approximately half the sheet length ΔXs. (i.e. ΔXo≈½·ΔXs).

FIG. 3B illustrates that in this example, the core elements 142$i$ in each core row 140$i$ (e.g. core elements 140$b$) are not shifted (i.e. ΔXd=0) in the longitudinal direction X relative to core elements 142$i$±1 of a directly adjacent core row 140$i$±1 (e.g. core elements 140$a$). Similarly, the sheets 162$i$ in each sheet row 160$i$ are also not shifted along X relative to the sheets 162$i$±1 of a directly adjacent sheet row 160$i$±1.

FIG. 3B also illustrates that first strips 180 of reinforcing fibre material may be arranged along and between adjacent first lateral sheet portions 166, and that second reinforcing strips 182 may be arranged along and between adjacent second lateral sheet portions 168.

FIG. 4 schematically shows a cross-sectional profile of the panel 20 from FIG. 1, in an YZ-plane along the transverse and vertical directions Y, Z. This FIG. 4 illustrates the overlapping (imbricated) arrangement of first and second lateral sheet portions 66, 68. FIG. 4 depicts the reinforcing strips 80, 82 and an enveloping body of hardenable substance 84 in the panel 20. The panel embodiment from FIGS. 3A-B may have similar YZ-cross-sectional profiles.

The first lateral portion 66 of each sheet 62 is folded over four adjacent core elements 42, yielding an imbricated four-layered overlap along the first surface 22 (or eight-layered, if including the first strips 80). Similarly, the second lateral portion 68 of each sheet 62 is folded over a sequence of four adjacent core elements 42 in the opposite direction, also yielding an imbricated four-layered overlap along the second surface 24 (or eight-layered, if including the second strips 82).

The first lateral portions 66 of the sheets 62 are oriented at third angles β1 with respect to the first panel surface 22. Similarly, the second lateral portions 68 of the sheets 62 are oriented at fourth angles β2 with respect to the second panel surface 24. Upper and lower surfaces of the rectangular cores 42 are tilted at similar angles, by slightly rotating each core 42 in each row 40 about an associated central core axis along the longitudinal direction X. This tilted arrangement allows the lateral sheet portions 66, 68 to extend in planar arrangement along each other and the cores 42, to exploit the tensile strength of the sheets 62 and improve the strength of the panel 20. In this example, the first and second panel surfaces 22, 24 are essentially parallel, and the third and fourth angles β1, β2 are essentially identical (β1≈β2). The value of these angles is preferably small e.g. 0°<β1, β2<5° or even 0°<β1, β2≤2°.

FIG. 5 schematically shows a cross-sectional profile of the panel associated with FIGS. 3A-B, in an XZ-plane along the longitudinal and vertical directions X, Z. This FIG. 5 illustrates the overlapping (imbricated) arrangement of leading and trailing edges 170, 172. FIG. 5 also depicts an enveloping body of hardenable substance 184 in the panel, but for clarity, only one overlap of two-layers in the transverse direction Y is shown (i.e. the reinforcing strips 180, 182 and overlap of additional lateral portions are omitted).

In this example, the leading edge 170 of each sheet 162 overlaps the trailing edge 172 of only one preceding sheet. Due to the overlap between leading edges 170 of sheets and trailing edges 172 of subsequent sheets 162 in a sheet row 160, the first lateral portions 166 are oriented along the first direction X at a first angle α1 with respect to the first panel surface 122. Similarly, the second lateral portions 168 are oriented at second angle α2 with respect to the second panel surface 124. Upper and lower surfaces of the rectangular cores 142 are tilted at similar angles, by slightly rotating each core 142 about an associated central core axis along the transverse direction Y. Again, the first and second panel surfaces 122, 124 are essentially parallel, so that the first and second angles α1, α2 are essentially identical (α1≈α2). The value of these angles is preferably small e.g. 0°<α1, α2<5° or even 0°<α1, α2≤2°.

Figure 6A:
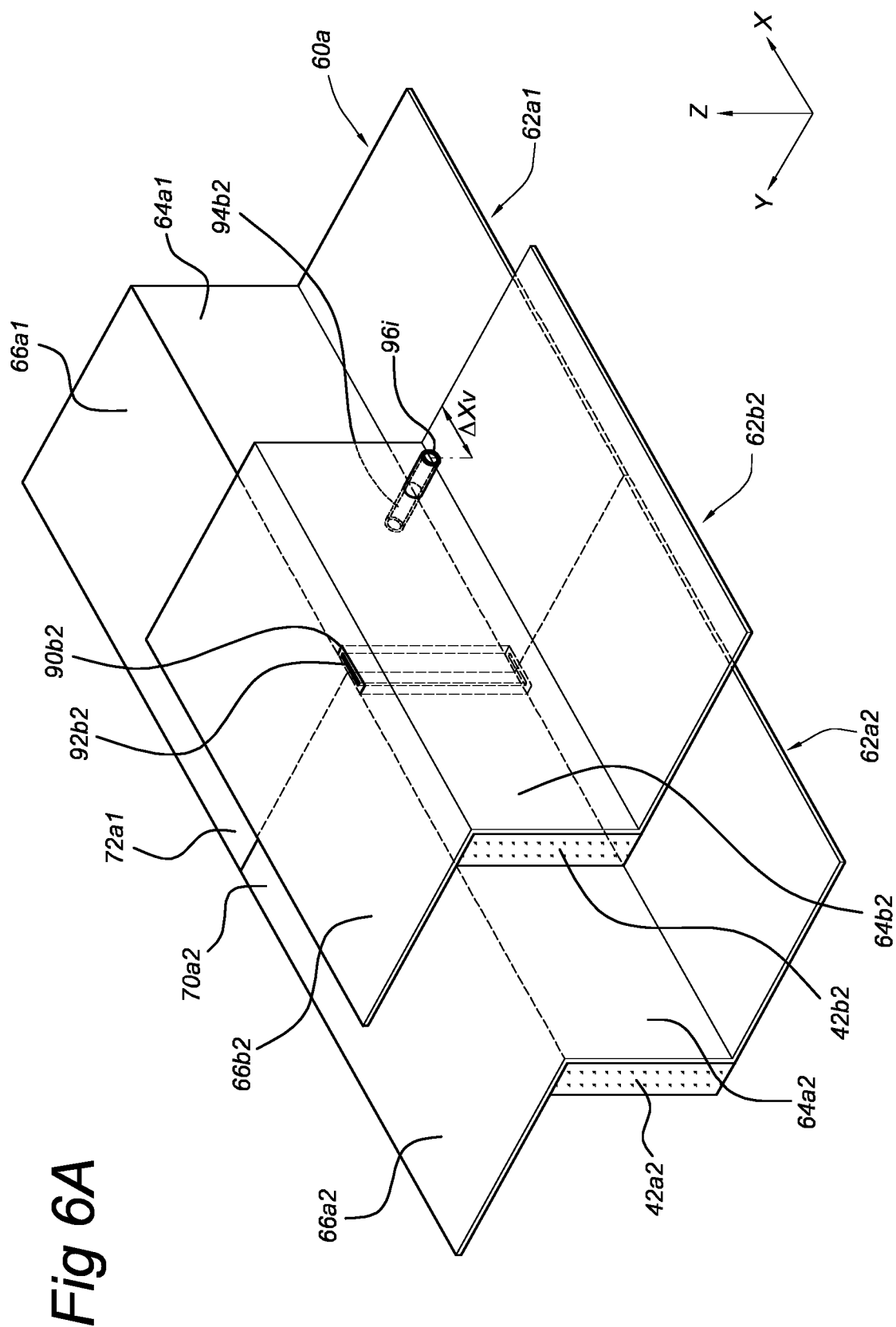
FIG. 6A presents a perspective view of an arrangement of sheets and cores in a panel according to an embodiment.

FIGS. 6A-6B presents perspective and cross-sectional views of an arrangement of cores 42 and sheets 62 that is similar to FIGS. 2A-B, but with additional features for facilitating resin moulding of the cores 42 and sheets 62 into a panel 20. Features that have already been described above with reference to FIGS. 2A-B may also be present in this further embodiment, and will not all be discussed here again. Like features are designated with similar reference numerals.

FIG. 6A illustrates that each of the core elements 42 (e.g. core 42b2) may define a recess 90 (e.g. 90b2) at a transverse side of the core element 42. This core element 42b2 is positioned against two adjacent medial sheet portions 64a1 and 64a2 of an adjacent sheet row 60a. The recess 90b2 is located along and facing a mating line located between a leading edge 70a2 of a sheet 62a2 of the adjacent sheet row 60a, and a trailing edge 72a1 of a preceding sheet 62a1 of the adjacent sheet row 60a. A patch 92b2 of impregnatable material is accommodated in the recess 90b2, and covers said mating line.

Core elements 42 are also provided with one or more through holes 94. Each such through hole 94 (e.g. hole 94b2) extends entirely through a corresponding core element 42 in the transverse direction Y, and accommodates part of a resin transfer moulding conduit 96.

FIG. 6B schematically shows a cross-sectional view of the arrangement in FIG. 6A, in an XY-plane along the longitudinal and transverse directions X, Y. This FIG. 6B illustrates the transversal arrangement and mutual alignment of recesses 90, patches 92, through holes 64, and conduits 96 in more detail.

The through holes 64 in adjacent core elements 42 of directly adjacent core rows 40 are interconnected to form passages. Each such passage accommodates a resin transfer moulding conduit 96, which extends through a plurality of core elements 42 and medial sheet portions 64 that are adjoining along the transverse direction Y.

Each through hole 94 is positioned at a longitudinal distance ΔXv from an edge of the corresponding core element 42. This distance ΔXv complies with ΔXv=½·(ΔXc−ΔXd) for predetermined values of the core length ΔXc and the mutual core offset ΔXd, so that the through holes 64 of transversely adjacent core elements 42 can always be aligned. ΔXd equals ½·ΔXc in this example, so that ΔXv equals ¼·ΔXc and that all core elements can have the same shape and only need to be rotated over 180° about a central axis along direction Y to be usable in all core rows.

Figure 7:
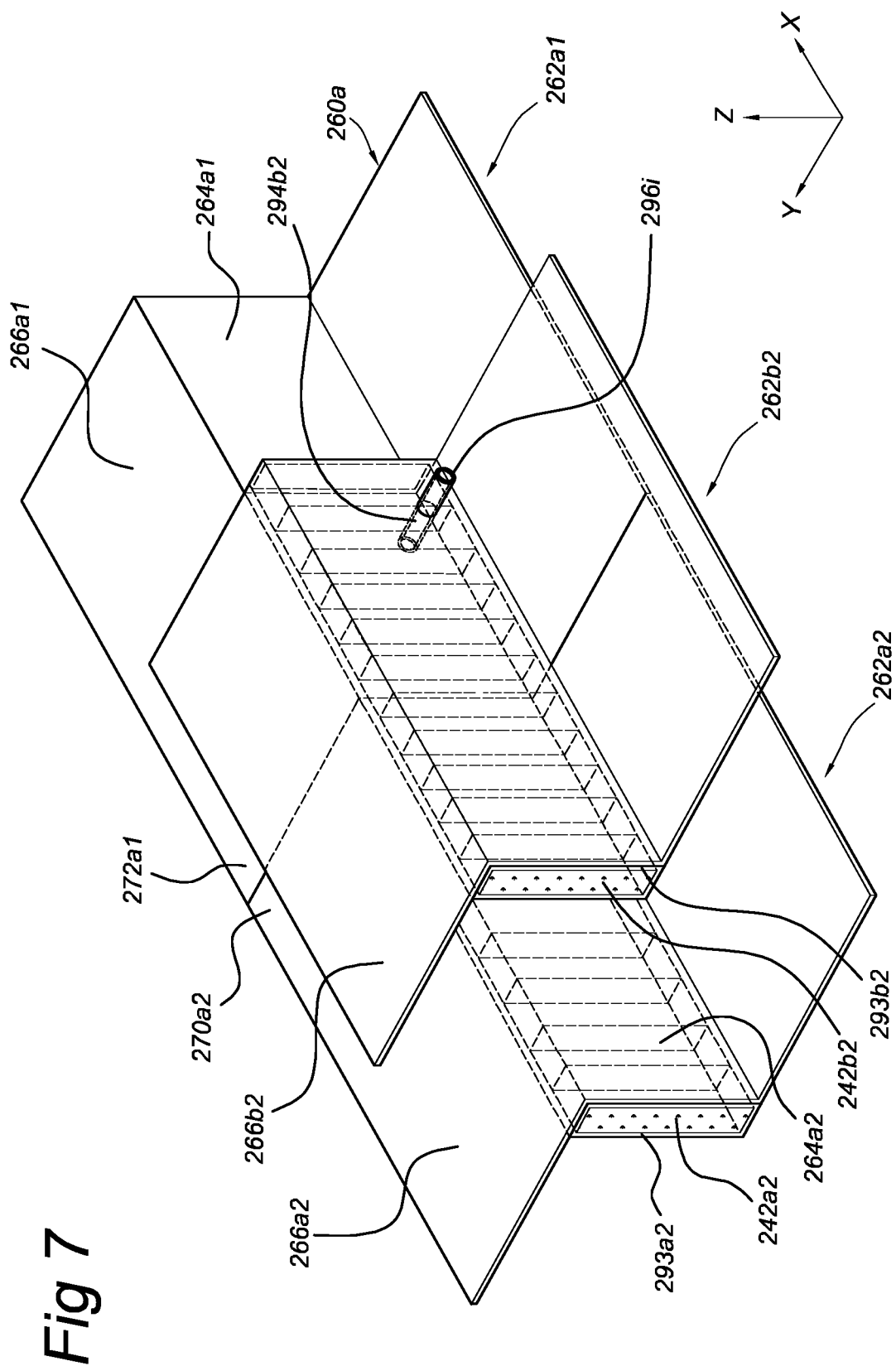
FIG. 7 presents a perspective view of an arrangement of sheets and cores in a panel according to another embodiment.

FIG. 7 shows an alternative arrangement of cores 242 and sheets 262, which is associated with another panel embodiment that is shaped similar to the panel 20 in FIG. 1. Features that have already been described above with reference to the panel 20 in FIGS. 1-2B and 6A-B may also be present in this panel embodiment, and will not all be discussed here again. For the discussion with reference to FIG. 7, like features are designated with similar reference numerals preceded by 200 to distinguish the embodiments.

In this example, each core element 242 comprises a wrap 293 of impregnatable sheet material, which extends directly around the core element 242. For instance, core element 242b2 is positioned against medial sheet portions 264a1 and 264a2 of adjacent sheet row 260a, with wrap 293b2 placed against and covering a mating line between leading edge 270a2 of sheet 262a2 and trailing edge 272a1 of preceding sheet 262a1 of the adjacent sheet row 260a.

Figure 8A:
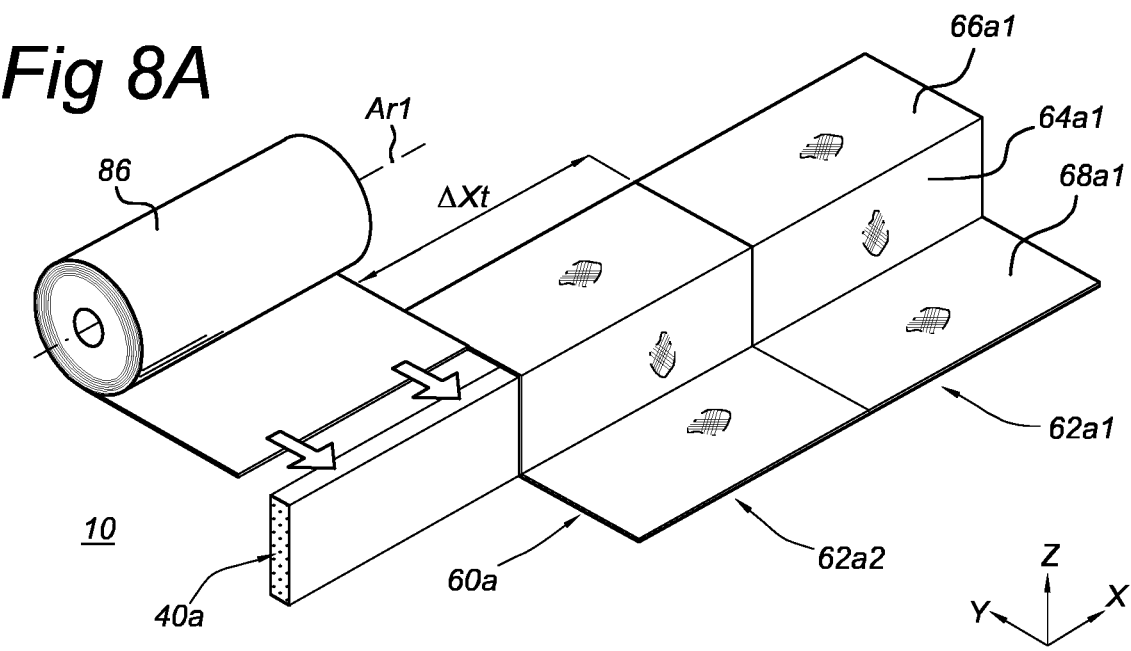
Figure 8B:
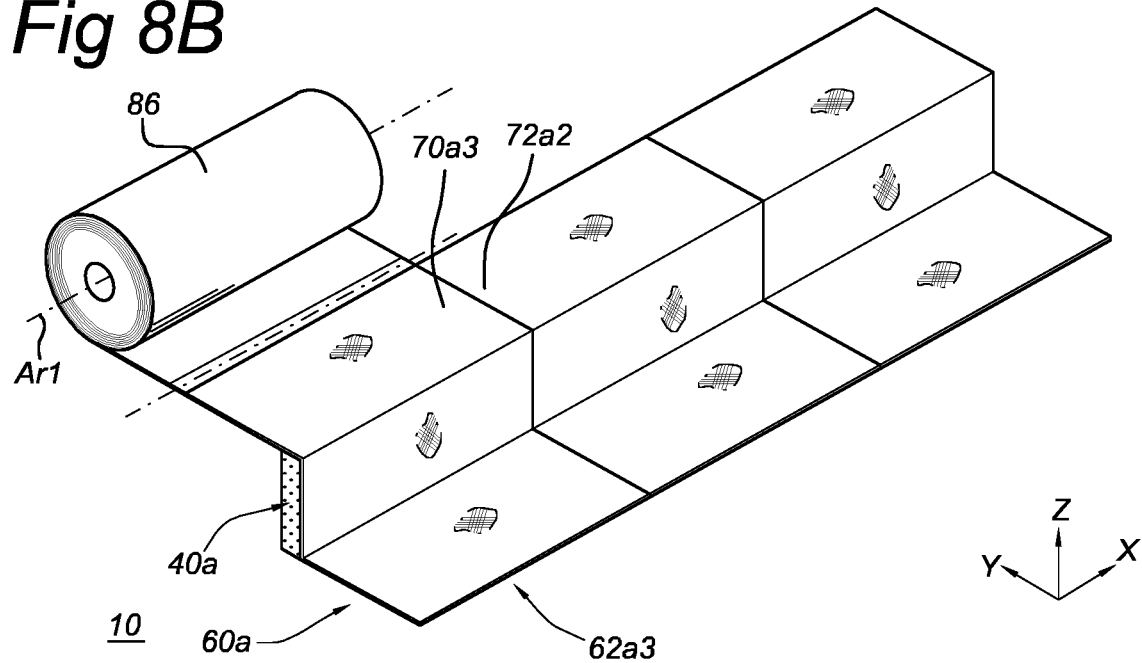

FIGS. 8A-8C illustrate manufacturing stages of a method for producing the panel 20 from FIGS. 1 and 2A-B. The method includes positioning of core elements and sheets 62 on a supporting base 10, into parallel core rows 40 and sheet rows 60 respectively, in accordance with a procedure and a resulting arrangement already explained with reference to FIGS. 2A-B. In this example, the sheets 62 include fibre material, and the method is based on resin moulding techniques, which are known per se.

FIG. 8A illustrates that the arrangement of sheets 62 may be obtained from a first roll 86 with sheet material that is rolled up around a roll axis Ar1. This roll 86 is positioned at various co-linear positions relative to the base 10, with the roll axis Ar1 parallel with the first direction X. A first core element 42 is placed onto the base 10. A first sheet 62a1 is then obtained by unrolling the roll 86 towards the negative transverse direction −Y. The first sheet 62a1 is placed onto the core element in a Z-resembling pattern, and cut from the roll 86.

The roll 86 is then translated along the negative longitudinal direction −X over a sheet translation distance ΔXt relative to the base 10, to a second position while keeping the roll axis Ar1 parallel with the longitudinal direction X. In general, a translation distance ΔXt equals a difference between the predetermined sheet length ΔXs and overlap length ΔXo (i.e. ΔXt=ΔXs−ΔXo). In this example, there is no overlap between sheets, so ΔXo=0 and ΔXt=ΔXs.

Second and further sheets 62a2, 62a3 are obtained by repeated translation, unrolling, positioning, and cutting in the manner described above and illustrated in FIG. 8B. In each such sequence, a leading edge 70a3 of the current sheet 62a3 is placed in an abutting arrangement with a trailing edge 72a2 of the preceding sheet 62a2 relative to the first direction X. In alternative embodiments with finite overlap ΔXo>0, the leading edge 70 of the current sheet 62 should be placed in an overlapping arrangement with a trailing edge 72 of the preceding sheet 62.

FIG. 8C illustrates that, strips 80, 82 are positioned along all first lateral sheet portions 66 and all second lateral sheet portions 68 of the same sheet row 60, once all sheets 62 of this sheet row 60 have been properly arranged along the corresponding core row 40. The first strip 80a may for instance be formed by providing a second roll 88 with sheet material that is rolled up around a second roll axis Ar2, positioning this roll 88 along the outermost first lateral sheet portion 66 with the roll axis Ar2 parallel with the second direction Y, unrolling the roll 88 to extend a strip 80 across all first lateral sheet portions 66, and cutting the strip 80 from the roll 88. The roll 88 is then translated along the negative transverse direction −Y relative to the base 10 and towards the outermost second lateral sheet portion 68, while keeping the roll axis Ar2 parallel with the transverse direction Y, and above sequence is repeated.

The above steps are repeated for multiple core rows 40, sheet rows 60, and strips 80, 82, to form an assembly similar to FIG. 1. This assembly can be enclosed under a cover layer and sealed with respect to the base 10 and the surroundings, to allow impregnation of the assembly with liquid resin.

It should be understood that the directional definitions and preferred orientations presented herein merely serve to elucidate geometrical relations for specific embodiments. Directional terms in the specification and claims are used herein solely to indicate relative directions and are not otherwise intended to limit the scope of the invention or claims. For instance, the directions and signs for specific coordinate axes are not necessarily restricted to a Cartesian right-handed orthogonal coordinate system. The positive and negative signs (e.g. ±X) are merely used to indicate opposite directions with respect to a single coordinate, and may be equally applicable in left-handed and/or skewed coordinate systems.

LIST OF REFERENCE SYMBOLS

Similar reference numbers that have been used in the description to indicate similar elements (but differing only in the hundreds) should be considered implicitly included.
- 10 mould
- 12 support surface
- 14 mould edge
- 16 cover
- 20 panel
- 22 first panel surface
- 24 second panel surface
- 26 first panel edge (e.g. longitudinal panel edge)
- 28 second panel edge (e.g. opposite longitudinal panel edge)
- 30 third panel edge (e.g. transversal panel edge)
- 32 fourth panel edge (e.g. opposite transversal panel edge)
- 40 core row
- 42 core element
- 60 sheet row
- 62 sheet (e.g. web or plate material)
- 64 medial sheet portion
- 66 first lateral sheet portion
- 68 second lateral sheet portion
- 70 leading sheet edge
- 72 trailing sheet edge
- 80 strip
- 82 further strip
- 84 hardenable substance (e.g. resin)
- 86 first roll
- 88 second roll
- 90 recess
- 92 patch (e.g. strip of impregnatable fabric)
- 94 through hole
- 96 conduit
- 293 wrap (e.g. sheet of impregnatable fabric)
- Ac core axis
- Ar1 first roll axis
- Ar2 second roll axis
- X first direction (longitudinal direction)
- Y second direction (transverse direction)
- Z third direction (vertical direction/axial direction)
- $\Delta Xc$ core length
- $\Delta Xs$ sheet length
- $\Delta Xo$ overlap length
- $\Delta Xd$ longitudinal core offset
- $\Delta Xv$ longitudinal hole distance
- $\Delta Z1$ sheet thickness
- $\Delta Z2$ strip thickness
- $\alpha 1$ first angle
- $\alpha 2$ second angle
- $\beta 1$ third angle
- $\beta 2$ fourth angle

The invention claimed is:

1. A composite structure, the structure comprising:
   a plurality of core elements forming elongated core rows that extend along a first direction and are arranged in a sequence along a second direction;
   a plurality of sheets forming sheet rows that are arranged in a sequence along the second direction, with individual sheet rows extending between and across the core rows, and wherein respective individual sheets define:
   a medial portion that is interposed between two adjacent core rows, and which extends with a component along a third direction transverse to the first and second directions;
   a first lateral portion continuing from one side of the medial portion, and folded predominantly towards the second direction over a first one of the two adjacent core rows;
   a second lateral portion continuing from an opposite side of the medial portion, and folded predominantly towards the second direction over the first one of the two adjacent core rows, or folded predominantly towards a negative second direction over another one of the two adjacent core rows;
   wherein the sheet rows include a first sheet row that comprises a first sheet and a second sheet placed at consecutive positions along the first direction, the second sheet having a leading edge that abuts or overlaps a trailing edge of the first sheet in the first direction,
   wherein the plurality of core elements are provided with a through hole extending entirely through a corresponding core element in the second direction,
   wherein the through hole is positioned at a longitudinal distance ($\Delta Xv$) from an edge of the core element, wherein the longitudinal distance is defined by $\Delta Xv = \frac{1}{2} \cdot \Delta Xc - \frac{1}{2} \cdot \Delta Xd$, and
   wherein through holes in adjacent core elements of core rows that are directly adjacent in the second direction are interconnected to form a passageway for conveying liquid resin, or for accommodating a conduit for conveying liquid resin.

2. The composite structure according to claim 1, wherein respective leading edges of the sheets in the first sheet row individually overlap in the first direction with respective trailing edges of preceding sheets in the first sheet row, thereby forming an imbricated sequence of tilted sheets.

3. The composite structure according to claim 2, wherein the first lateral portions of the sheets in the first sheet row are tilted at a first angle $\alpha 1$ in a range $0° < \alpha 1 < 5°$ about the second direction and with respect to the first surface, and/or wherein the second lateral portions of the sheets in the first sheet row are tilted at a second angle $\alpha 2$ in a range $0° < \alpha 2 < 5°$ about the second direction and with respect to the second surface.

4. The composite structure according to claim 2, wherein a length of overlap between leading edges of respective sheets and trailing edges of preceding sheets in the first sheet row approximately equals half a sheet length.

5. The composite structure according to claim 1, wherein respective leading edges of the sheets in the first sheet row individually abut against respective trailing edges of preceding sheets in the first sheet row, without overlapping in the first direction, thereby forming a continuous sequence of sheets in which the medial portions are mutually level, the first lateral portions are mutually level, and the second lateral portions are mutually level.

6. The composite structure according to claim 1, wherein the sheet rows include a second sheet row distinct from but adjacent to the first sheet row viewed along the second direction, the second sheet row comprising a third sheet having a first lateral portion that overlaps the leading edge at the first lateral portion of the second sheet and simultaneously overlaps the trailing edge at the first lateral portion of the first sheet.

7. The composite structure according to claim 1, wherein the core rows include a first core row and a second core row distinct from but adjacent to the first core row viewed along the second direction, the first and second core rows each being composed of a sequence of core elements that are mutually abutting and arranged in line along the first direction, and wherein a medial portion of each respective sheet in the first sheet row extends transverse with a component along the third direction, and is interposed between a respective core element from the first core row and a respective core element from the second core row;

wherein a first lateral portion of each respective sheet in the first sheet row continues from one side of the associated medial portion, and is folded predominantly towards the second direction over the respective core element in the first core row;

and wherein a second lateral portion of each respective sheet in the first sheet row continues from an opposite side of the associated medial portion, and is either folded predominantly towards the second direction over the respective core element in the first core row, or is folded predominantly towards the negative second direction over the respective core element in the second core row.

8. The composite structure according to claim 7, wherein at least one of the core elements in the second core row is a recessed core element that is positioned against medial portions of the first and second sheets in the first sheet row, the recessed core element defining a recess at a surface of the core element that faces in the second direction and towards the medial portions, the recess accommodating a patch of impregnatable material;

wherein the recess faces and extends along a mating line where the leading edge of the second sheet and the trailing edge of the first sheet abut or overlap, and the patch directly covers said mating line.

9. The composite structure according to claim 7, wherein at least one of the core elements comprises a wrap of impregnatable sheet material, the wrap extending directly around the core element, wherein the core element is positioned against medial sheet portions of sheets in the first sheet row, with a portion of the wrap directly covering a mating line where the leading edge of the second sheet and the trailing edge of the first sheet abut or overlap.

10. The composite structure according to claim 7, wherein lengths ($\Delta Xs$) of respective individual sheets in the sheet rows along the first direction are substantially identical to lengths of respective individual core elements in the core rows along the first direction.

11. The composite structure according to claim 1, wherein the first lateral portions of the sheets are tilted at a third angle $\beta 1$ in a range $0°<\beta 1<5°$ about the first direction and with respect to the first surface.

12. The composite structure according to claim 1, wherein the second lateral portions of the sheets are
either folded predominantly towards the second direction and tilted at a fourth angle $\beta 2$ in a range $-5°<\beta 2<0°$ about the first direction with respect to the second surface;
or folded predominantly towards the negative second direction and tilted at a fourth angle $\beta 2$ in a range $0°<\beta 2<5°$ about the first direction with respect to the second surface.

13. The composite structure according to claim 1, wherein the sheets have sheet lengths defined in the first direction, the sheets lengths being substantially identical.

14. The composite structure according to claim 1, wherein outer contours of the core rows and/or the core elements viewed in cross-sectional planes perpendicular to the first direction have mirror symmetry and/or discrete rotational symmetry.

15. The composite structure according to claim 1, having a concave outer surface shape with a smooth curvature in the third direction as a function of position along the first direction, the first and third directions being substantially perpendicular to the second direction.

* * * * *